(12) United States Patent
Bartetzko et al.

(10) Patent No.: US 10,724,364 B2
(45) Date of Patent: Jul. 28, 2020

(54) CREATION OF STRUCTURAL EARTH FORMATION MODELS

(71) Applicants: Anne Claudia Maria Bartetzko, Celle (DE); Stefan Wessling, Hannover (DE); Nicklas Jeremias Ritzmann, Celle (DE); Stephen A. Morris, Aberdeenshire (GB); Florent Kelfoun, Aubertin (FR)

(72) Inventors: Anne Claudia Maria Bartetzko, Celle (DE); Stefan Wessling, Hannover (DE); Nicklas Jeremias Ritzmann, Celle (DE); Stephen A. Morris, Aberdeenshire (GB); Florent Kelfoun, Aubertin (FR)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 272 days.

(21) Appl. No.: 15/911,228

(22) Filed: Mar. 5, 2018

(65) Prior Publication Data
US 2018/0252101 A1 Sep. 6, 2018

Related U.S. Application Data

(60) Provisional application No. 62/467,295, filed on Mar. 6, 2017.

(51) Int. Cl.
*G01V 1/40* (2006.01)
*E21B 49/00* (2006.01)
(Continued)

(52) U.S. Cl.
CPC ............... *E21B 49/00* (2013.01); *E21B 7/04* (2013.01); *E21B 44/00* (2013.01); *E21B 47/12* (2013.01);
(Continued)

(58) Field of Classification Search
None
See application file for complete search history.

(56) References Cited

U.S. PATENT DOCUMENTS 6,125,203 A 9/2000 Keskes et al.
7,359,844 B2 4/2008 Sung et al.
(Continued)

FOREIGN PATENT DOCUMENTS

WO 2015168417 A1 11/2015
WO 2017019718 A1 2/2017

OTHER PUBLICATIONS

International Search Report, International Application No. PCT/US2018/021099, dated Jun. 20, 2018, Korean Intellectual Property Office; International Search Report 3 pages.
(Continued)

*Primary Examiner* — Aditya S Bhat
(74) *Attorney, Agent, or Firm* — Cantor Colburn LLP

(57) ABSTRACT

Systems and methods for performing drilling operations in earth formations. The systems and methods include drilling a borehole within the earth formation, receiving data acquired within the borehole in the earth formation, analyzing the data to locate a plurality of data structures formed by the data, the plurality of data structures including a first structure at a first location and a second structure at a second location, projecting the first structure as a first geological projection intersecting the first location, and projecting the second structure as a second geological projection intersecting the second location, classifying the first geological projection and the second geological projection based on a hierarchy of geological feature types to generate a hierarchical classification, and adjusting one or more of the first geological projection and the second geological projection based on the hierarchical classification.

20 Claims, 11 Drawing Sheets

(51) Int. Cl.
   *E21B 44/00*   (2006.01)
   *E21B 7/04*    (2006.01)
   *E21B 47/12*   (2012.01)
   *G01V 1/50*    (2006.01)
   *G01V 3/18*    (2006.01)
   *G01V 5/12*        (2006.01)
   *G01V 3/20*        (2006.01)
(52) U.S. Cl.
   CPC .................. *G01V 1/50* (2013.01); *G01V 3/18* (2013.01); *G01V 3/20* (2013.01); *G01V 5/12* (2013.01)

(56) References Cited

U.S. PATENT DOCUMENTS

| | | | |
|---|---|---|---|
| 7,359,845 B2 | 4/2008 | Kelfoun | |
| 7,751,280 B2 | 7/2010 | Denichou et al. | |
| 8,244,472 B2 | 8/2012 | Clavaud | |
| 8,725,477 B2 | 5/2014 | Zhang et al. | |
| 2008/0195319 A1 | 8/2008 | Wilkinson et al. | |
| 2010/0122847 A1 | 5/2010 | Xia et al. | |
| 2010/0305927 A1 | 12/2010 | Suarez-Rivera et al. | |
| 2011/0091078 A1 | 4/2011 | Kherroubi et al. | |
| 2011/0106507 A1 | 5/2011 | Lepage | |
| 2013/0125677 A1* | 5/2013 | Amanullah | G01N 33/2823 73/866 |
| 2015/0134255 A1 | 5/2015 | Zhang et al. | |
| 2016/0027185 A1 | 1/2016 | Elkington et al. | |
| 2019/0226314 A1* | 7/2019 | Dasys | E21B 41/0092 |

OTHER PUBLICATIONS

International Written Opinion, International Application No. PCT/US2018/021099, dated Jun. 20, 2018, Korean Intellectual Property Office; International Written Opinion 6 pages.

Schlumberger; "FMI-HD High Definition Formation Microimager"; 2013; 16 Pages.

* cited by examiner

CREATION OF STRUCTURAL EARTH FORMATION MODELS

CROSS REFERENCE TO RELATED APPLICATIONS

This application claims the benefit of an earlier filing date from U.S. Provisional Application Ser. No. 62/467,295, filed Mar. 6, 2017, the entire disclosure of which is incorporated herein by reference.

BACKGROUND

Various operations are performed by the energy industry to evaluate earth formations and produce hydrocarbons. Such operations include drilling, stimulation and production. Various types of sensor devices and logging tools are utilized by the energy industry in order to evaluate earth formations and reservoirs, for purposes such as exploration, formation evaluation, stimulation and production.

Some measurement data can be used to evaluate the architecture of subsurface formations. For example, digital models of earth formations can be constructed using data ranging from seismic measurements acquired at the surface, sea bottom or in boreholes, up to the identification and description of features observed on cores which are retrieved from a borehole drilled into a subsurface portion. In addition, data and/or images acquired from measurement devices such as resistivity and gamma tools can provide information used to construct formation models.

SUMMARY

According to some embodiments, methods for performing drilling operations in earth formations are described herein. The method include drilling a borehole within the earth formation, receiving data acquired within the borehole in the earth formation; analyzing the data to locate a plurality of data structures formed by the data, the plurality of data structures including a first structure at a first location and a second structure at a second location, projecting the first structure as a first geological projection intersecting the first location, and projecting the second structure as a second geological projection intersecting the second location, classifying the first geological projection and the second geological projection based on a hierarchy of geological feature types to generate a hierarchical classification, and adjusting one or more of the first geological projection and the second geological projection based on the hierarchical classification.

According to some embodiments, systems for performing drilling operations in earth formations are described herein. The systems include a processing device configured to receive data acquired within a borehole in the earth formation. The processing device is configured to perform: analyzing the data to locate a plurality of data structures formed by the data, the plurality of data structures including a first structure at a first location and a second structure at a second location; projecting the first structure as a first geological projection intersecting the first location, and projecting the second structure as a second geological projection intersecting the second location; classifying the first geological projection and the second geological projection based on a hierarchy of geological feature types to generate a hierarchical classification; and adjusting one or more of the first geological projection and the second geological projection based on the hierarchical classification.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
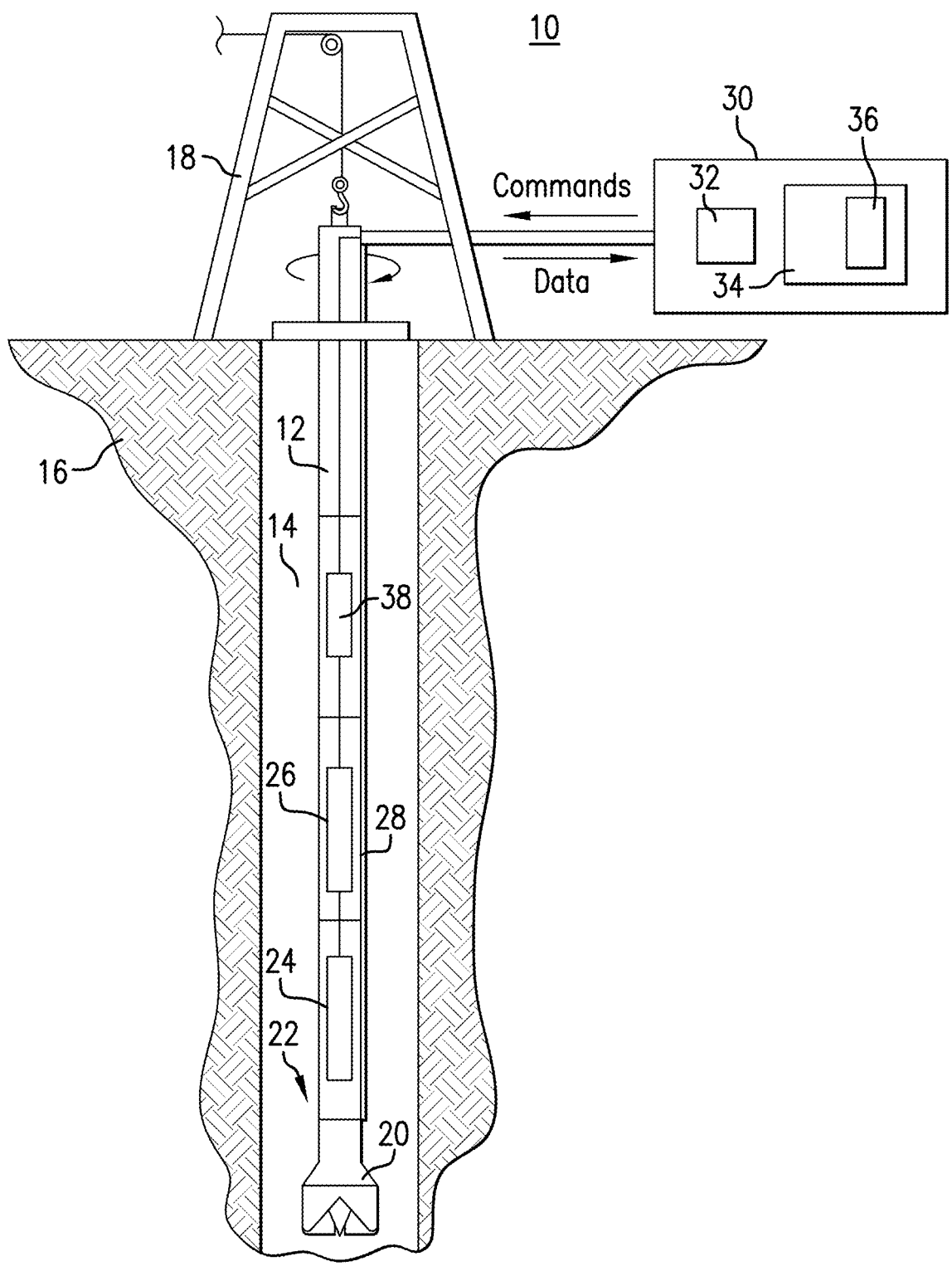
FIG. 1 depicts an embodiment of a system for performing energy industry operations.

FIG. 1 illustrates an example of a system 10 that can be used to perform one or more energy industry operations such as drilling, stimulation, measurement and/or production operations. The system 10 in this example is a drilling system that includes a drill string 12 disposed in a borehole 14 that penetrates at least one earth formation 16. The drill string 12 extends from a surface assembly 18 that includes equipment such as a derrick, rotary table, pumping devices and others. Although the borehole 14 is shown in FIG. 1 to be vertical and of constant diameter, the borehole 14 may be of varying diameter and/or direction (e.g., azimuth and inclination). The system 10 and/or the drill string 12 can include various downhole components or assemblies, such as a drilling assembly including a drill bit 20 and other drilling components such as a mud motor. The system 10 and/or drill string 12 can also include various measurement tools and communication assemblies, one or more of which may be configured as a bottomhole assembly (BHA) 22.

Although the system 10 is described as a drilling system, it is not so limited and can be any type of energy industry system, such as wireline or production system. The various measurement tools may be included for performing measurement regimes such as wireline measurement applications, logging-while-drilling (LWD) applications and measurement-while-drilling (MWD) applications. Sensors may be disposed at one or multiple locations along a borehole string, e.g., in the BHA 22, in the drill string 12, in a logging sonde conveyed into the borehole via a wireline, or as distributed sensors.

Various types of sensors and/or measurement devices may be included downhole for measuring parameters related to the downhole environment. For example, the drill string 12 includes a resistivity tool 24 for bulk resistivity and/or resistivity imaging, and an orientation sensing tool (including e.g., magnetometers, accelerometers). In another example, the drill string 12 includes a gamma ray or density tool 26, which can be disposed in addition to or in place of the resistivity tool 24.

Various other sensing devices or tools may be incorporated in the system 10. Examples of such devices include temperature sensors, pressure sensors, strain sensors, calipers and others. The system 10 may also include one or more distributed sensor systems (in place of or in addition to the non-distributed sensors).

The sensors and tools shown in FIG. 1 are examples provided for illustrative purposes and are not intended to be limiting. Any number or type of sensor and/or tool may be incorporated into the drill string 12 and/or system 10. Other examples of devices that can be used to perform measurements include resistivity tools, nuclear (e.g., density and/or neutron) tools, gamma ray tools, acoustic tools, nuclear magnetic resonance tools, seismic data acquisition tools, acoustic impedance tools, formation pressure testing tools, fluid sampling and analysis tools, coring tools and/or any other type of sensor or device capable of providing information regarding a formation, borehole and/or operation.

A processing unit 30 may be connected in operable communication with components of the system 10 and may be located, for example, at a surface location. The processing unit 30 may also be incorporated in the drill string 12 or the BHA 22, or otherwise disposed downhole as desired. Components of the drill string 12 or other borehole string may be connected to the processing unit 30 via any suitable communication regime, such as mud pulse telemetry, electro-magnetic telemetry, wired links (e.g., hard wired drill pipe or coiled tubing), wireless links, optical links or others. The processing unit 30 may be configured to perform functions such as controlling drilling and steering, transmitting and receiving data, processing measurement data and/or monitoring operations. The processing unit 30, in one embodiment, includes a processor 32 and a data storage device (or a computer-readable medium) 34 for storing data, models and/or computer programs or software 36. Other processing devices may be included downhole, such as downhole electronics 38.

In one embodiment, a processing device or processor, such as the processing unit 30, downhole electronics 38 or a remote processor, is configured to perform evaluations or assessments of earth formations. The processing device is configured to construct and/or update a mathematical model of the formation that describes structural features of the formation. The mathematical model is referred to herein as a "structural model."

The structural model may be constructed based on various sources of measurement data. The measurement data is analyzed to identify characteristics of the measurement data that are associated with various types of geological features. Geological features are identified and associated with depths or locations at or around a borehole, and the geological features are geometrically projected from a representation of the borehole (e.g., a line or axis) based on orientations derived from the measurement data and/or other information. The geometric projections, which may be generated as lines for a two-dimensional model or projections for a three-dimensional model, are referred to herein as "geological projections." The projections, lines, and/or planes can be flat or curved.

The structural model is also constructed based on a set of rules that specify how different geological projections interact with each other at intersections between geological projections. In one embodiment, the geological features associated with each geological projection are classified according to a set of hierarchical rules. The rules are applied in conjunction with a hierarchical classification of types of geological features, where each type of geological feature is assigned a rank. The rules specify how different ranks are treated when adjusting the geological projections at points of intersection.

Any suitable types of measurement data may be used to construct the structural model. Suitable types of data include data acquired from seismic surveys (surface and/or downhole), core samples and downhole measurements. Examples of downhole measurements include electrical resistivity or conductivity, acoustic (e.g., travel time and/or reflection amplitude), natural gamma radiation, density, magnetic resonance, neutron, spontaneous potential and other measurements. Additional sources of measurement data can be, e.g., a deep shear-wave image or a surface detected from a deep-reading resistivity device, hereinafter "deep-reading measurements."

Some measurement data may be acquired from borehole logs, which can include logging data in the form of, e.g., data values, curves and/or images acquired by a tool located in a bottom-hole assembly or at one or more other locations along a borehole string. Such data can be acquired as logging-while-drilling (LWD) images, or acquired after the borehole has been drilled, e.g., as wireline logs.

In one embodiment, construction of the structural model includes interpreting measurement data to identify data structures or features of the data that are associated with and can be classified as specific types of geological features. For example, data structures can be identified based on interpretation of a geological image (e.g., resistivity, acoustic, density, gamma ray, etc.), and structures visible in the image can be picked and interpreted. The geological features can be classified according to any desired criteria, such as depth, estimated age, rock type, mineral or material composition, and/or origin (such as, but not limited to, a fault or fracture or being a stratigraphic boundary between different depositional environments).

For example, geological features can be identified as intersecting the borehole at depths or locations corresponding to sinusoidal patterns (i.e., sinusoids) in one or more image logs. Geological features may be defined by a depth position or longitudinal position in the borehole, and directional information such as true dip and dip azimuth. Another means of identifying geological boundaries is the usage of deep-reading resistivity technologies, such as multi-propagation resistivity. Forward and/or inversion modeling approaches may be used to infer geological features such as sedimentary or structural boundaries. Another means of identifying geological boundaries can include the use of acoustic reflection measurements, also referred to as deep acoustic imaging or deep shear/compressional wave imaging. Such methods are able to detect geological features with high impedance contrast. For both measurements, the orientation of the geological features may also be identified.

Construction of the structural model also includes geometrically projecting each geological feature from a representation of the borehole as a geological projection. The geological projections are incorporated into the structural model based on a hierarchical classification and rules that dictate how the geological projections are constructed and how different geological projections interact with one another. The structural model is then populated according to the classification and rules. It will be appreciated by those of skill in the art that geological features do not necessarily have to intersect the borehole if deep-reading technologies such as acoustic or resistivity measurements are employed.

The models and embodiments described herein provide a fast and automated means to setup an initial structural Earth model. The model can then be modified in an intuitive way by changing the classification of features, for example using a borehole image or image log and updating the structural model.

Geological features and the corresponding geological projections can be categorized according to various criteria. For example, geological features can include structural, digenetic and stratigraphic features, which can be differentiated on image logs. Other types of geological features may include faults and fractures. Stratigraphic features are hard or soft formation boundaries which originate from different depositional environments during the geological history of creating sedimentary rock. Depositional environments may vary between continental, transitional, marine and other environments.

The deposition of sediments in such environments may be changing over geological times, so that a deposition may be classified according to a stratigraphic type or unit. Different units impact the deposition to different extents, so that one unit defined over a long geological time scale may overprint another unit over a shorter geological time scale. Geological features and corresponding geological projections may thus be classified according to the different geological units into sequence boundaries, bed boundaries, cross-beddings, intra-beddings, etc.

In addition, the measurement data can be analyzed to estimate the direction and/or orientation of an identified geological feature, such as the dip and/or azimuth. In one embodiment, the dip of a geological projection is considered to be the true dip, i.e. the magnitude of a maximum slope between the geological projection and a horizontal projection. The true dip azimuth can be defined as the angle between the line of maximum slope and North. In contrast, the apparent dip can be defined as the angle between the geological projection and the horizontal in any direction other than the true dip direction. The apparent dip azimuth defines this direction. Relative dip can be defined as the angle between the geological projection and a plane orthogonal to the borehole in the direction of the borehole. Relative dip azimuth may correspond to the azimuth of the borehole.

Figure 2:
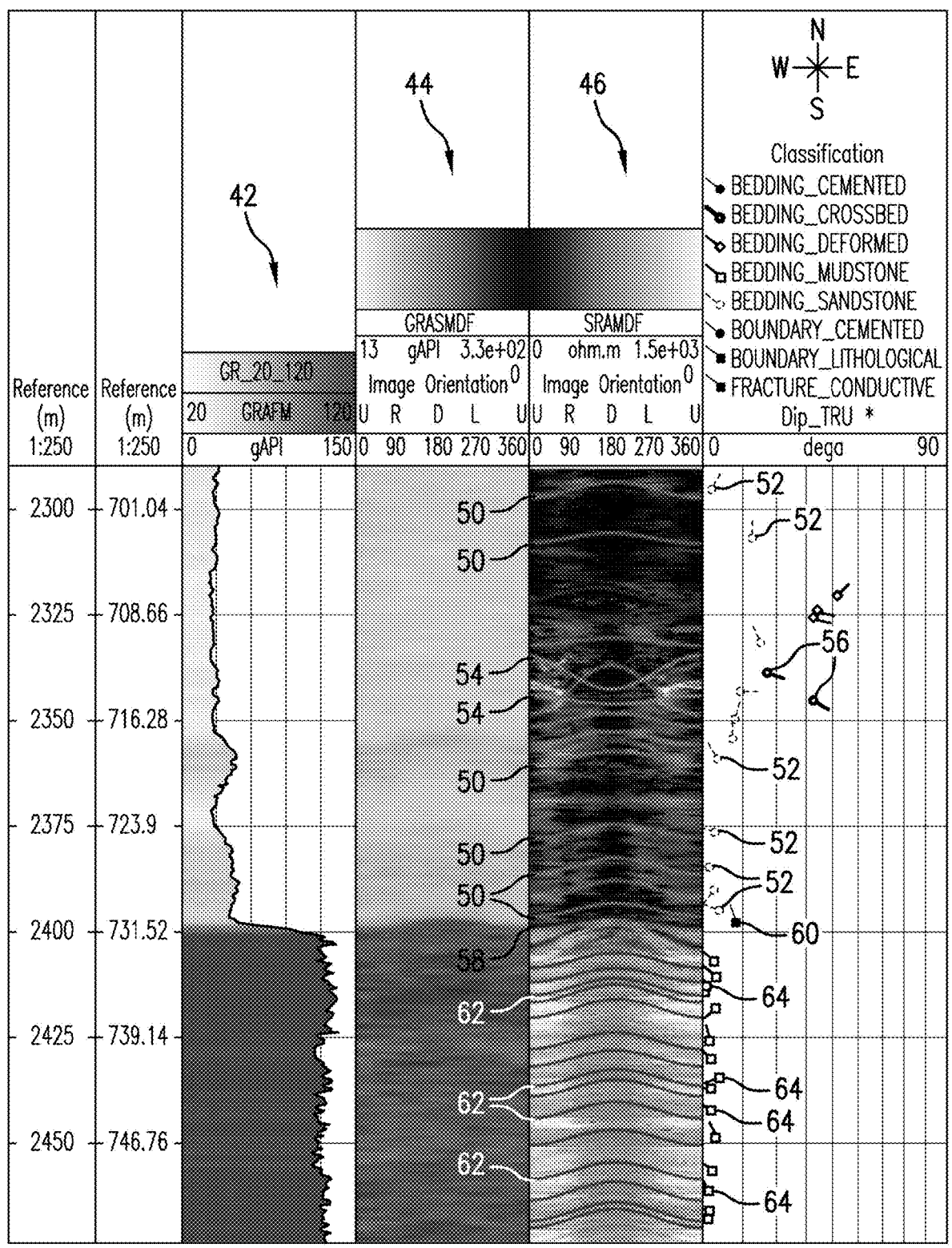
FIG. 2 depicts an example of measurement data that can be used to construct a structural earth model and geological projections and/or geological bodies generated based on the measurement data.
Figure 3:
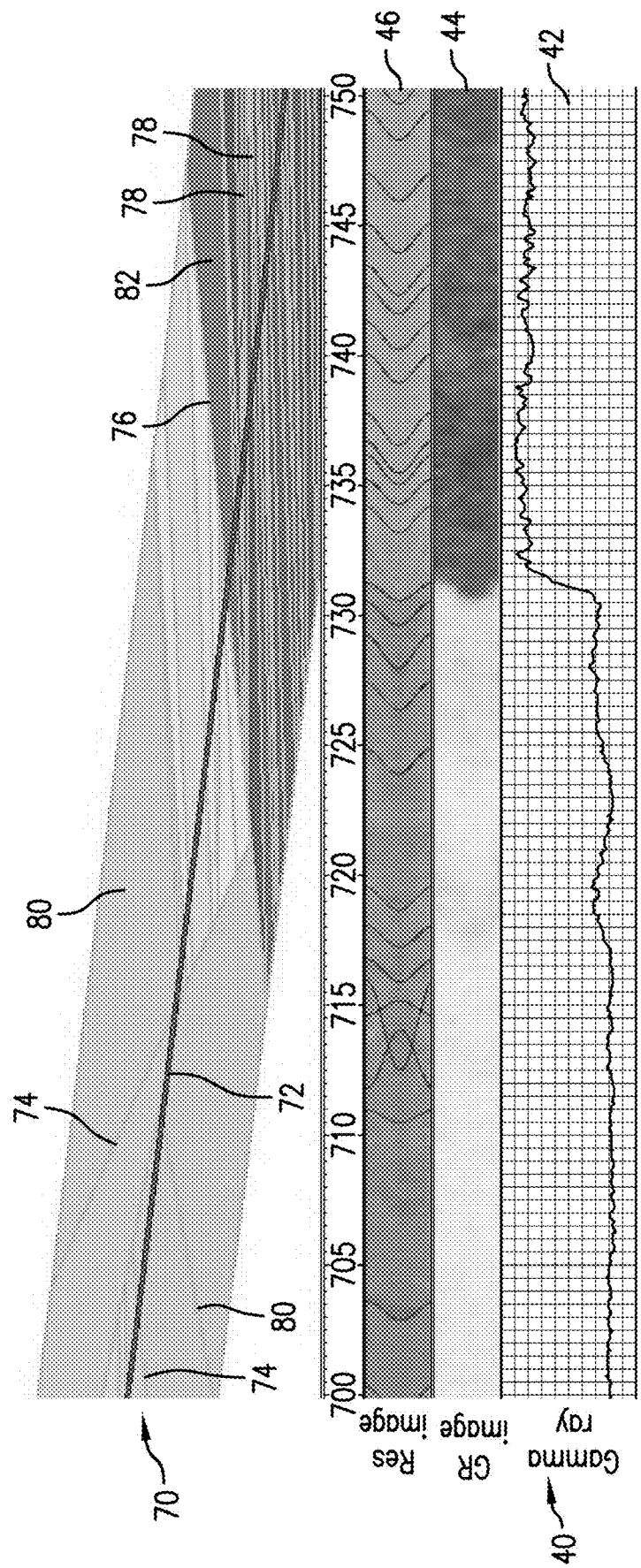
FIG. 3 depicts a portion of the measurement data of FIG. 2, and an example of geological projections and geological bodies generated therefrom.

FIGS. 2 and 3 show an example of measurement data that can be used to construct a structural earth model and illustrates how geological projections and/or geological bodies are identified. The measurement data in this example includes a borehole log 40 having a gamma ray log 42, a gamma ray image 44 and a resistivity image 46. Data in the log 40 is displayed as a function of depth.

Interpretation of the measurement data includes identifying data structures in the resistivity image 46. The data structures may be any recognizable structure or pattern in the data that can be associated with a respective type of geological features. For example, various sinusoidal structures (sinusoids) are visible in the resistivity image 46 and can be analyzed to identify a type of geological feature. Each sinusoid has properties that can be associated with a type of geological feature, such as shape, amplitude, slope and others.

In this example, different sinusoids are correlated with corresponding geological features. The correlation can be performed by a processing device via reference information (e.g., a look up table), or identified by a human operator based on the operator's experience. Each identified sinusoid is picked and analyzed. Classification and orientation of each sinusoid is displayed in this example as markers displayed at a depth of the corresponding sinusoid and showing the dip angle associated with the sinusoid, which can be determined via any suitable technique (e.g., inversion and/or geometric calculation) using image interpretation software.

Each sinusoid is identified by one or more common or similar properties and correlated with a geological characterization shown as a marker. Markers in this example are color coded to indicate the classification and have tails pointed in the direction of the orientation. In this example, a first group of sinusoids 50 having similar properties are marked via markers 52 that show the classification of the geological projection and the dip angle of the geological projection. The sinusoids 50 are classified as sandstone bedding layers (or beddings). A second group of sinusoids 54 are classified as cross-beddings and denoted by markers 56. Another sinusoid 58 is classified as a lithological boundary and denoted by a marker 60. Lastly, sinusoids 62 are classified as mudstone beddings and denoted by markers 64.

As shown in FIG. 3, a structural model 70 is initially constructed by geometrically projecting each identified measurement data structure as a geological projection away from a representation of the borehole (shown here as a borehole trajectory 72). FIG. 3 shows a section of the borehole log 40 and illustrates how geological projections are projected for each identified sinusoid. A geological projection associated with a given structure is projected away from the borehole trajectory 72 and intersects the borehole trajectory 72 at a depth or longitudinal location of the trajectory.

In the example of FIG. 3, the projected geological projections include sandstone bedding planes 74 corresponding to sinusoids 50 in FIG. 2, a lithological boundary plane 76 (FIG. 3) corresponding to the sinusoid 58 (FIG. 2), and mudstone bedding planes 78 (FIG. 3) corresponding to the sinusoids 62 (FIG. 2).

Geological bodies may then be constructed using the geological projections. In one embodiment, each geological body is a polyhedron at least partially bounded by one or more geological projections. The formation structure type associated with each geological body may be identified based on the measurement data, which can be the same data used to construct the geological projections and/or additional data (e.g. from a different type of measurement tool).

In the example of FIG. 3, geological bodies are constructed based on the geological projections. For example, a number of geological bodies are shown and defined by the geological projections, such as sandstone bodies 80 and mudstone bodies 82. In this example, the geological bodies are identified and color coded based on the gamma ray image 44. As shown, the geological bodies may be constrained by boundaries defining a region surrounding the borehole, as discussed further below.

In the example discussed herein, the structural model is two-dimensional, thus the geological projections are generated as lines and the geological bodies are generated as two-dimensional planes. For three-dimensional models, the geological projections can be projected as two dimensional planes, and the geological bodies can be generated as three-dimensional polygons. In addition, although the geological projections and bodies are shown as being modeled as straight lines or flat planes, they are not so limited, as the projections and/or bodies may form a different shape, such as curves, rough or undulating forms.

Figure 4:
FIG. 4 depicts a two-dimensional graph showing an example of geological projections having different orientations projected from a borehole trajectory.

As shown in the above examples, not all projections are parallel to each other and therefore there will be intersections at some point. This is shown in FIG. 4, which illustrates a simplified example of geological projections projected from a borehole axis. In this example, the model is constructed as a two dimensional graph 90 having a vertical axis corresponding to true vertical depth and a horizontal axis corresponding to horizontal distance. Among other benefits, graphs provide flexibility and computational performance. Their computational speed makes them suitable for the creation and update of structural models not only post-well but also in real time. In addition, handling many projections and/or bodies as large as 7500 or more are possible within seconds using the graph theory. Although embodiments are described herein using two-dimensional graphs, any suitable graphical format may be used (in either two or three dimensions).

One important aspect of the structural model from the graph theory is application to a relatively larger number of highly inclined and/or horizontal wells which are commonly drilled during a field development phase. Many operators of hydrocarbon fields are nowadays time- and resource-constrained so that the interpretation of LWD logs including images (i.e., image logs) is typically not conducted in detail because the threshold to invest additional time and effort is very high. In particular, the usage of structural information across an entire hydrocarbon field to re-evaluate the depositional environment is typically not conducted. However, a better understanding of the depositional environment can have significant influence on the decision of placing and constructing production and injector wells, which ultimately helps to define and increase recovery. Today, typical recovery rates are in the range of about 50%, depending on the compartmentalization complexity of the fields. Typically, conventional interpretation activities are conducted manually by geologists or on a large scale (e.g., seismic scale) using computer-aided software. However, advantageously, embodiments of the present disclosure allow for a fast and efficient interpretation of the structural information along wellbore trajectories for many wells, which opens a new way of using images from a geologist's perspective.

For real-time or while-drilling geosteering/reservoir navigation or well construction decisions, a detailed subsurface model requires frequent updates based on additional data and information acquired during a drilling process. Whereas previous modeling activities are user-intensive, for example by defining and updating surfaces in a digital model, embodiments of the present disclosure allow an automated, fast modeling of structures around a wellbore using information gathered from images and/or image logs. Accordingly, embodiments of the present disclosure provide a means to conduct steering and/or navigation decisions while drilling a borehole.

The borehole axis in the example of FIG. 4 is represented by a trajectory line 92. Multiple geological projections are depicted, including a geological projection 94, which cuts the trajectory line at the deepest point (the greatest depth, e.g., true vertical depth or measured depth) relative to other geological projections 96. The geological projection 94 is thus considered to be the oldest geological projection.

As geometric projections used to calculate intersections assume planar surfaces, the result may not always be geologically reasonable. For example, stratigraphical boundaries or bed boundaries do not intersect each other, but one will truncate the other. Some tectonic planes, e.g. fractures or faults, however, may intersect bed boundaries and/or other structural features.

Accordingly, in one embodiment, the modeling method includes the application of logical rules which reflect geological knowledge to the best approximation. The logical rules are based on a hierarchy of types of geological features that are used to determine the interaction between individual projections. The geological classification represents the interpretation of the geological projections, and the hierarchy defines the rule that is applied for the structural model.

The way the intersecting geological projections are handled is determined using the hierarchy and the rules. In one embodiment, the hierarchy is used to estimate how geological projections truncate each other, and the geological projections are adjusted to reflect the topological relationships between intersecting geological projections to create the structural earth model.

In one embodiment, a structural model is constructed by analyzing various information associated with each geological projection, such as the hierarchical categorization of the geological projections, the nature or type of each geological projection, the stratigraphical position, location along a borehole and geometrical parameters. Analysis of this information allows the processing device to determine topological relationships between the geological projections and to control how the model should be modified.

Typically, two nearby geological projections of different dip value will present an intersection that needs to be resolved. In this case, analysis of the geological projections and of the geological context according to the hierarchy and rules is used to determine the topological relationship between the projections and adjust one or more projections accordingly. For example, the hierarchy and rules are used to determine where an edge needs to be added to the model, what vertex should be subsequently eliminated and the relevant stratigraphy to be assigned to the newly created domains. This process is repeated until all the geological projections are integrated into the model and all their interactions are adequately handled.

Table 1 lists an example of geological projections that may be encountered, together with a potential set of hierarchy and rules. Table 1 shows an example of a hierarchy of geological projection types and associated rules that define the logic used to construct the structural model. In this example, the hierarchical position is denoted by level numbers, where the lowest level number indicates the highest priority. Table 1 is as follows:

| Geological sedimentary features (stratigraphic origin) | | Logic for implementation |
| --- | --- | --- |
| Level ID | Description of type | Rule |
| 1 | Sequence boundary | This projection cuts and truncates level 2 and all lower level types |
| 2 | Erosive/amalgamation incision surface | This projection cuts and truncates level 3 and all lower level types |
| 3 | Bedding (top or base) | This projection cuts and truncates level 4 and all lower level types |
| 4 | Cross-bedding | This projection cuts and truncates level 5 |
| 5 | Intra-bedding | All higher level types cut and truncate this projection |

It is noted that the hierarchy and rules may be changed by, e.g., an operator or the processor based on changing conditions. For example, if new geological projections are identified that were not originally incorporated into the hierarchy and rules, the hierarchy and rules can be adjusted accordingly.

Figure 5:
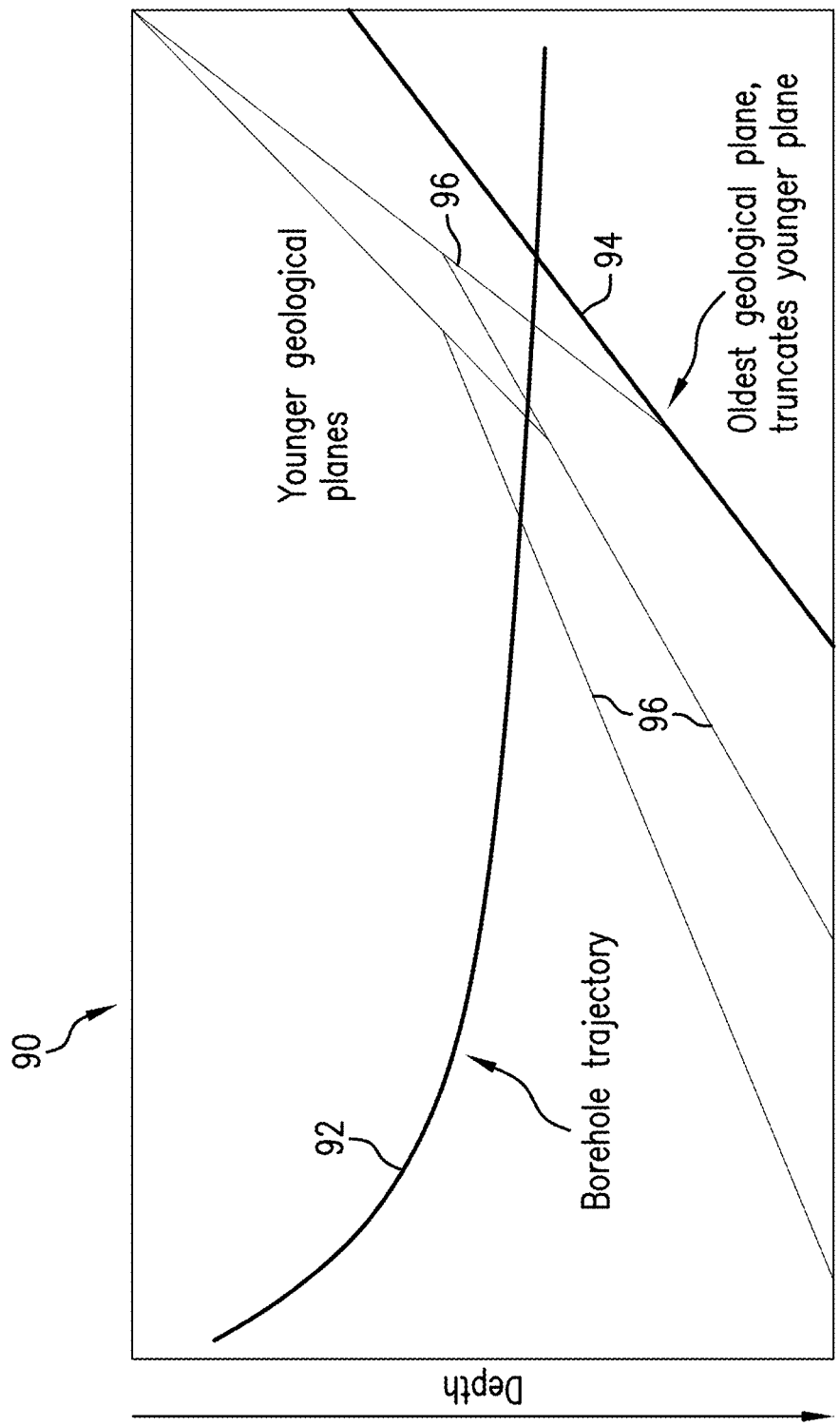
FIG. 5 illustrates how the geological projections of FIG. 4 are adjusted according to hierarchical rules to create a structural earth model.

An example of a structural model is shown in FIG. 5, which is constructed by truncating projections using rules and a hierarchy that indicates priority based on the depth at which projections intersect a borehole. The depth may be, for example, true vertical depth (TVD) and/or measured depth (MD). In this example, the hierarchy is based on depth, where projections having greater depths have a higher position on the hierarchy than projections having shallower depth. Although the rules in this example are exclusively concerned with depth, additional properties can be considered. Using a hierarchy based on depth is useful in formations such as typical "layer-cake" environments.

The processor in the example of FIG. 5 performs a method that includes identifying measurement data structures and projecting the data structures as geological projections to generate an initial model. The processor executes logic that begins with the oldest projection 94, where the processor determines whether the oldest projection 94 intersects any younger projections, and if so, truncates the younger projection. The processor then proceeds to the immediately preceding projection (the next youngest) intersecting the borehole and truncates any intersecting projections that are younger than the next projection. This process continues until all of the projections have been evaluated and truncated accordingly, resulting in an adjusted model shown in FIG. 5.

The example of FIG. 5 may be encountered in case of stratigraphical boundaries and bed boundaries in a flat-layered geology which is transected by an inclined borehole trending downwards (tectonically-undisturbed depositional sequence). In other geological situations, or when the borehole is trending upwards, the logic may have to be reversed; e.g. the deepest structure (with respect to measured depth) is no longer considered to represent the oldest structure. In some cases, it can be necessary to switch between the two approaches within the same borehole.

The classification of single data structures can be adjusted or changed in various ways to, e.g., provide for more or less refined structural modelling. For example, the rules can include a general rule (e.g. that an older geological projection truncates a younger geological projection) that can be combined with other classifications and/or hierarchies to account for more complex interactions between formation features.

Figure 6:
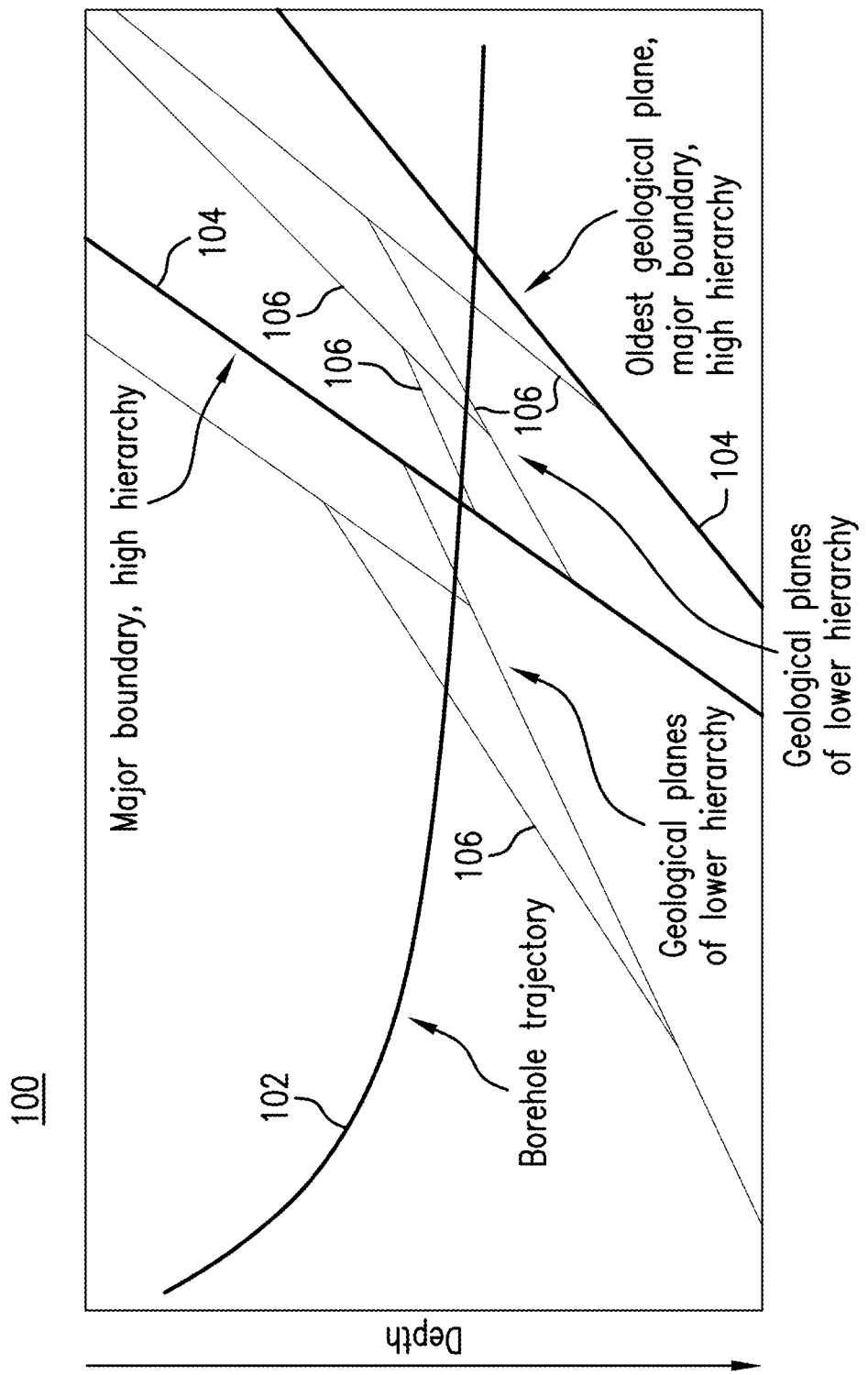
FIG. 6 depicts aspects of a two-dimensional structural earth model including geological projections having different orientations and the interaction between geological projections at intersections according to selected hierarchical rules.

FIG. 6 show an example of a structural model 100 constructed according to rules that include a general rule combined with additional classification and hierarchy. In this example, the general rule specifies that older geological boundaries truncate younger geological projections if the projections otherwise have the same classification. In addition, the model is constructed according to a hierarchy that assigns a rank to geological projections and features according to some other criteria.

As shown in FIG. 6, the structural model 100 includes a borehole trajectory line 102 and projected geological projections that intersect the trajectory line 102 at various locations. Geological projections 104 are classified as major boundaries having a relatively high rank, and other projections 106 having a lower rank. In constructing the model 100, when a first geological projection intersects a second geological projection, the first geological projection truncates the second geological projection if the first geological projection has a greater depth (i.e., is older). However, if the geological projections have different hierarchical ranks (e.g., a major boundary projection 104 intersects an older but lower ranking projection 106), the geological projection having the higher rank truncates the lower ranked projection regardless of age or depth (e.g., the major boundary truncates any lower ranking projection 106).

This way, important unconformities or erosional surfaces can truncate older geological projections or cross-bedding structures. Additionally, more complex diagenetic features can be realized.

In one embodiment, the hierarchical approach applies for geological projections of sedimentary origin, where the hierarchy can be derived from the depositional process. In some cases, geological projection types may be defined that may not be amenable to a direct hierarchical ranking.

For example, fractures may cut stratigraphical and bed boundaries without truncating them or being truncated. Fractures can be incorporated into the model and rules for interactions between fractures and other types of projections are applied to intersect the fractures and other types. Alternatively, fractures can be displayed with the model but set as inactive in the sense of the modelling process.

Also, faults that intersect stratigraphical and bed boundaries may create a significant offset and therefore require a different handling. For example, if the offset (direction and amount) is not known, they can be handled like fractures (e.g., they are displayed but not taken into consideration for the modelling) until more information is available.

Table 2 lists an example of geological projections that may be encountered and not readily categorized by a hierarchy (e.g., the hierarchy shown in Table 1), together with a potential set of rules. This set of rules can be applied without other rules or hierarchies, or can be applied in combination with a hierarchy (e.g., the hierarchy and rules shown in Table 1). Table 2 is as follows:

| Geological structural features Description of type | Logic for implementation Rule |
|---|---|
| Fault | This projection cuts all projection types and hierarchical levels; separate logics may be applied for portions of the model at different sides of the borehole; may be set inactive if offset is unknown; may require additional logic and/or manual adjustment |
| Unconformity | This projection cuts all sequence boundaries and projections at a lower hierarchical level than sequence boundaries; |
| Fracture | This projection is displayed but set inactive for modeling |
| Others (e.g., slumps, uncertain, storm deposits, water escape structures, compaction/load casts, etc.) | Not included in the basic logic set; set inactive; may require additional logic and/or manual adjustment |

When the geological situation becomes very complex, manual adjustment may be advisable or required. Depending on the use of the structural model, not all hierarchy levels of geological projections may be needed. For example, fractures and internal beddings may be too detailed for large scale applications and can be hidden or set inactive. In some geological situations, it may be required to combine two projections into a single projection, e.g., in the case of channel structures. In this case, both projections may be truncated and the remaining remnants are combined into a single roof-shaped structure, representative of a curved projection.

In principle, geological projections may extend indefinitely. However, the resulting models may not be realistic as in nature, as geological surfaces may not be perfectly planar. Therefore, the modelling may be limited to a defined envelope around the borehole.

Figure 7:
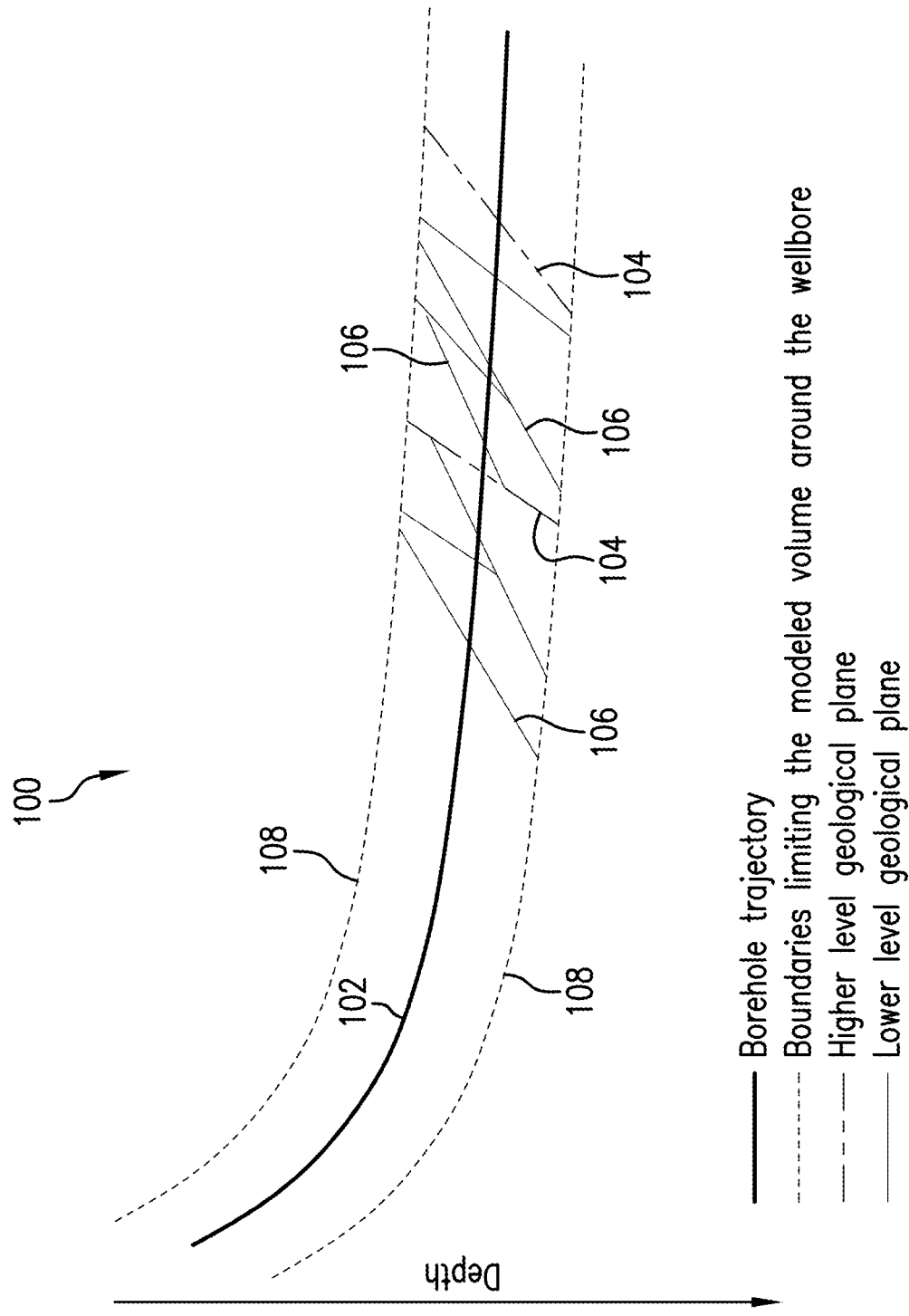
FIG. 7 depicts the structural earth model of FIG. 6, which is limited by boundaries defining a near-borehole region.

FIG. 7. Shows an example of the model that is limited in extent to a selected distance from a borehole. In this example, the model 100 includes boundaries 108 that are set at a selected lateral distance from the borehole to establish a limited volume or area (also referred to an envelope) around the borehole.

When a structural model is used for formation evaluation log interpretations and processing, the envelope may represent the depth of investigation of the measuring tools. If the model is used for correlation into a larger three-dimensional model (e.g. including seismic), single major planes (faults, unconformities) may need longer extension to facilitate correlation. These extended models can then be used to create more realistic property distributions for reservoir modeling workflows.

The interpretation of the borehole image may not always be unambiguous and the structural model may suggest that single geological projections may have to be reclassified. Also, the hierarchy and the geological classification are open. It may be possible to have bed boundaries of different hierarchy in one well if it is required to obtain a realistic structural model.

Coming back to the interpretation of borehole images, different physical properties may be able to resolve geological features at different scales. For example, high-resolution electrical images may be able to resolve structures in the range of centimeters whereas gamma ray images exhibit a coarser resolution. Therefore, different geological features may be identified on different images or image logs, so that the combination of images may highlight the stratigraphic type or class of a geological feature.

Figure 8:
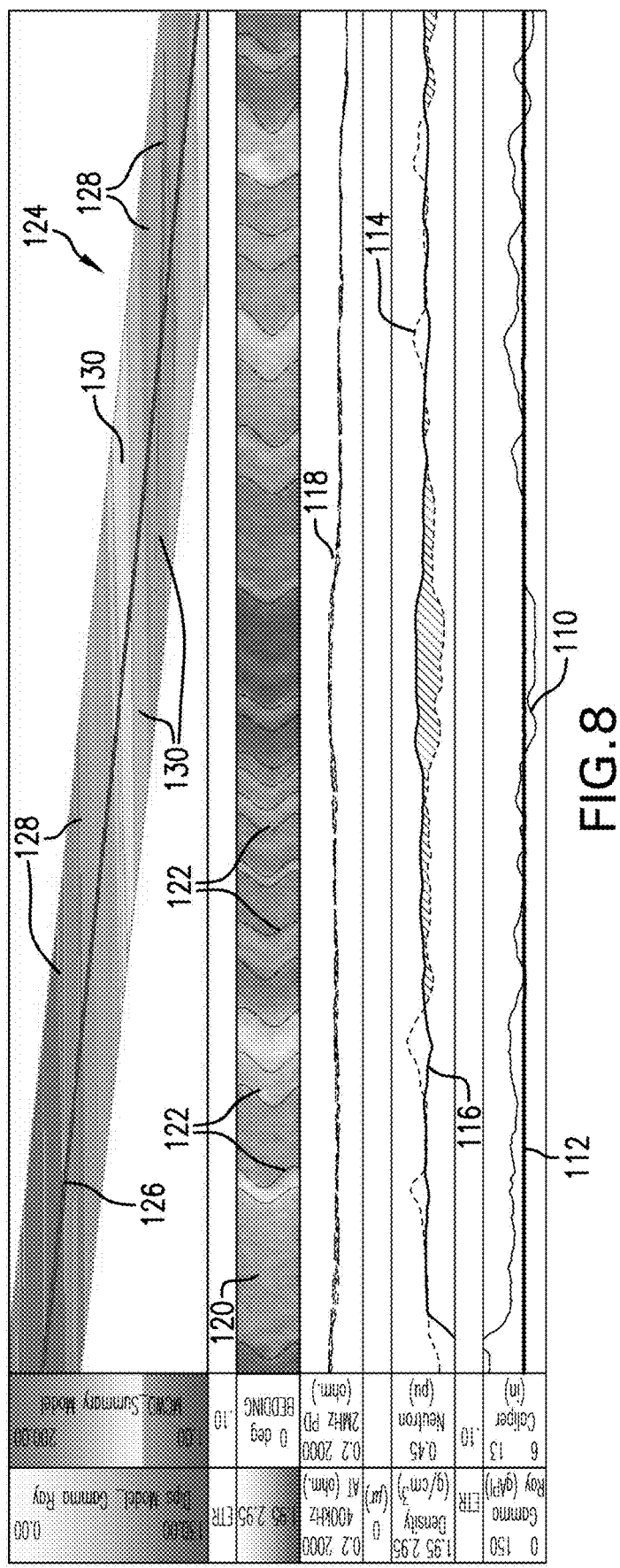
FIG. 8 depicts an example of borehole measurement data and a structural earth model constructed according to embodiments described herein.
Figure 9:
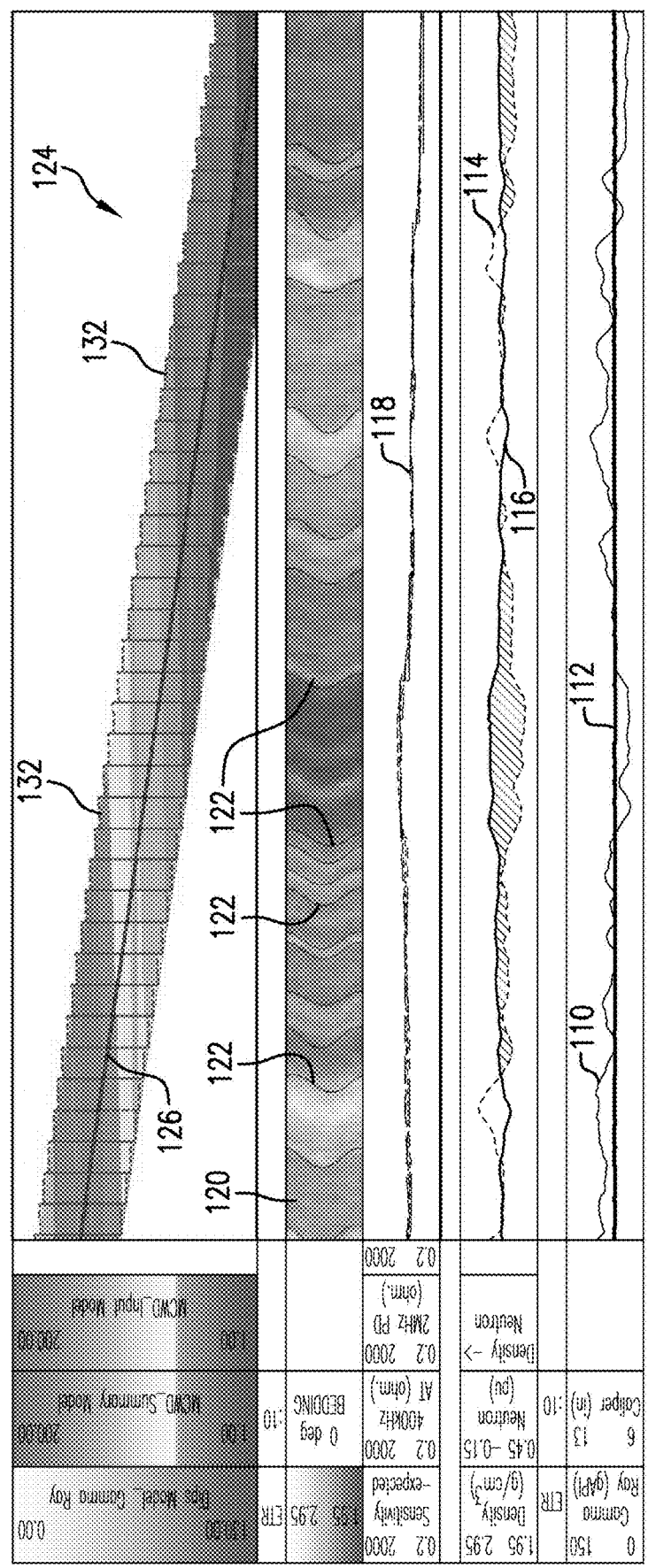
FIG. 9 depicts the structural earth model of FIG. 8 prepared for use in an inversion process.
Figure 10:
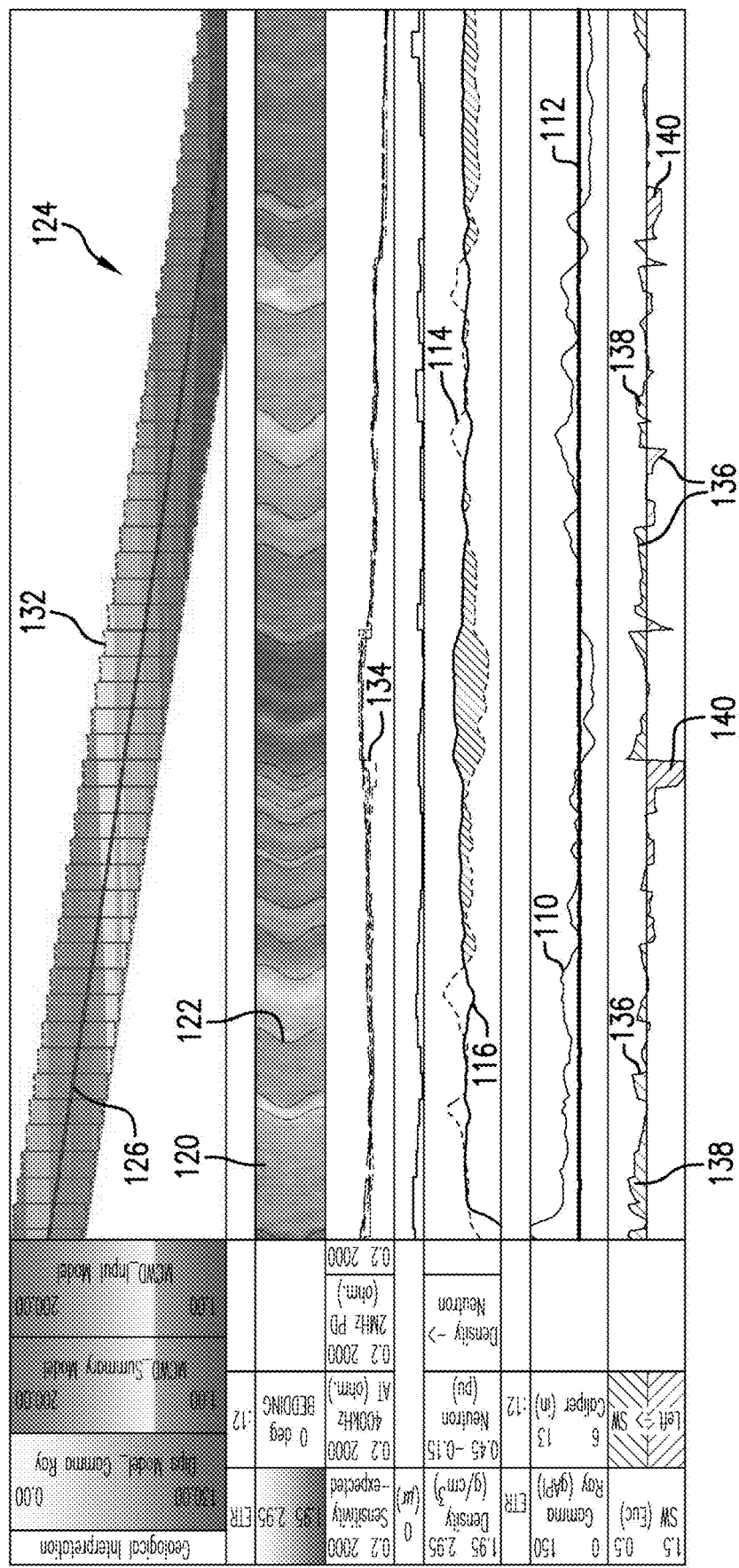
FIG. 10 depicts results of the inversion discussed in conjunction with FIG. 9.

FIGS. 8-10 illustrate an example of a structural model constructed as discussed herein, and aspects of a use of the structural model in formation evaluation. In this example, the formation that is evaluated is a relatively simple and close to horizontally layered geological environment.

FIG. 8 shows measurement data including gamma ray data 110, caliper data 112, density data 114, neutron log data 116 and resistivity data 118. A density image 120 was acquired, and multiple sinusoids 122 were identified and marked. In this example all sinusoids 122 identified on the density image 120 were classified as bedding planes. As there is no hierarchical difference between the structures in this example, a truncation rule based on depth/age was applied. The rule specifies that deeper/older geological projections truncate shallower/younger projections.

A structural model 124 was constructed by representing a borehole as a borehole trajectory line 126, and geological planes 128 were projected from the trajectory line 126 at locations corresponding to the depth of associated sinusoids 122. Geological bodies 130 were identified as bounded by the geological planes 128 and color-coded by average gamma ray values.

Formation evaluation processing was performed using a resistivity inversion process. Referring to FIG. 9, the single layers or geological bodies 130 in the structural model 124 were each assigned an average resistivity value (derived from the resistivity data 118), and the model was split into numerous individual vertical profiles 132. The width of the profiles 132 may be varied according to the complexity of the structural model.

The profiles 132 were input to an inversion processing engine for a one dimensional resistivity inversion assuming that the layers extend infinitely in the lateral. Layer thicknesses were thus constrained by the structural information from the image 120 and average resistivity values were used for the structural model input, whereas the inversion engine determined the best possible resistivity model. As thickness of the layer and vertical position of the profiles 132 change from profile to profile, the structural earth model 124 is taken into account and provides a 1.5 dimensional representation of the resistivity distribution along the borehole trajectory 126.

One potential application of the inversion result includes estimating water saturation ratio in cases where an accurate saturation model is unknown. Water saturation is typically derived by an equation such as the Archie equation:

$$S_w = \sqrt[n]{\frac{R_w}{\varphi^m R_t}} \qquad (1)$$

where $S_w$ is the water saturation, $R_w$ is the resistivity of the water-bearing formation, $R_t$ is the formation resistivity of the reservoir, $\varphi$ is the porosity, and m and n are the cementation and saturation exponent, respectively. Whenever exponents or input parameters other than the formation resistivity are unknown, a water saturation ratio $S_{wr}$ can be obtained based on the following equation:

$$S_{wr} = \frac{S_w^1}{S_w^2} = \sqrt[n]{\frac{R_t^2}{R_t^1}} \qquad (2)$$

where $S_w^1$ is the water saturation from one resistivity log and $S_w^2$ is the saturation from another resistivity log. The saturation ratio thus describes, without knowledge of many input parameters, how water (and consequently hydrocarbon) saturations compare from different resistivity logs. For example, $R_t^1$ may be the resistivity from the inversion and $R_t^2$ the measured resistivity to highlight how much change in saturation can be expected from inverted resistivity models.

FIG. 10 shows an example of results of the inversion using the structural model 124. Horizontal resistivity as resulted from the inversion was plotted as a thick black line 134 in the resistivity track. Saturation ratio data 136 is given in the lowermost track, including areas defined by the ratio data 136 that are shaded or colored based on comparing the ratio data to the measured resistivity. For example, areas 138 indicate a lower water saturation (and thus higher hydrocarbon saturation) compared to the measured resistivity, and areas 140 indicate a higher water saturation compared to the measured resistivity.

The example of FIG. 10 shows a considerable difference in saturation ratio between the inverted and measured resistivity, which may not have otherwise been recognized, thus resulting in a more accurate assessment of water saturation and resistivity. More accurate resistivity data is important for many applications. For example, having more accurate resistivity assessments as a basis for saturation estimates is important for assessment of the reservoir and quantification of hydrocarbons.

It is noted that this example is provided for illustration purposes and represents one of various uses of the structural model. Construction of structural earth models and associated analyses is not limited to use for formation evaluation, and can be used for many purposes. Additional applications of embodiments described herein include (but are not limited to) the following.

For example, the structural earth model may be used in conjunction with a property earth model for tool response modeling of, e.g., formation evaluation logs, including neutron, spectral neutron, gamma, magnetic resonance, etc. Tool response modeling may include a forward simulation of expected tool readings based on the structural earth model. Tool response modeling may also include inverting the structural earth model until a match is achieved between forward simulated tool responses and measured tool responses. The structural model may also be used to visualize measured or simulated formation properties around a wellbore, for example by color-coding the layers defined by the structural model by a formation property.

The structural model may be used to evaluate a fluid distribution within formations around a reservoir. For example, a fluid characteristic such as a fluid component or composition may be visualized in a structural model to evaluate the connectivity of reservoir compartments The structural model may also be used to correlate geological structures from an image or image log with geological structures depicted from deep-reading measurements. For example, deep compressional or shear wave acoustic images may reveal geological structures around a wellbore as far as but not limited to 30 meters away from a wellbore. The structural model may be updated if geological structures do not align. In another example, the structural model may be used in conjunction with ultra-deep reading resistivity measurements.

The structural model may also be used to estimate hydrocarbon reserves around a wellbore. The structural model may also be used to design a completion string along a wellbore. For example, perforation intervals may be defined based on the interpretation of the structural model. In another example, flow units may inferred from a structural model and inflow-control-devices (ICD's) may be selected and/or placed based on the structural information of the model The structural model may be used to upscale a formation property. For example, a number of fine layers in the structural model may be combined using an upscaling approach into one larger, representative layer exhibiting average properties of the fine layers. The structural model may be used to upscale formation properties to larger scale reservoir models, including models based on seismic data.

Figure 11:
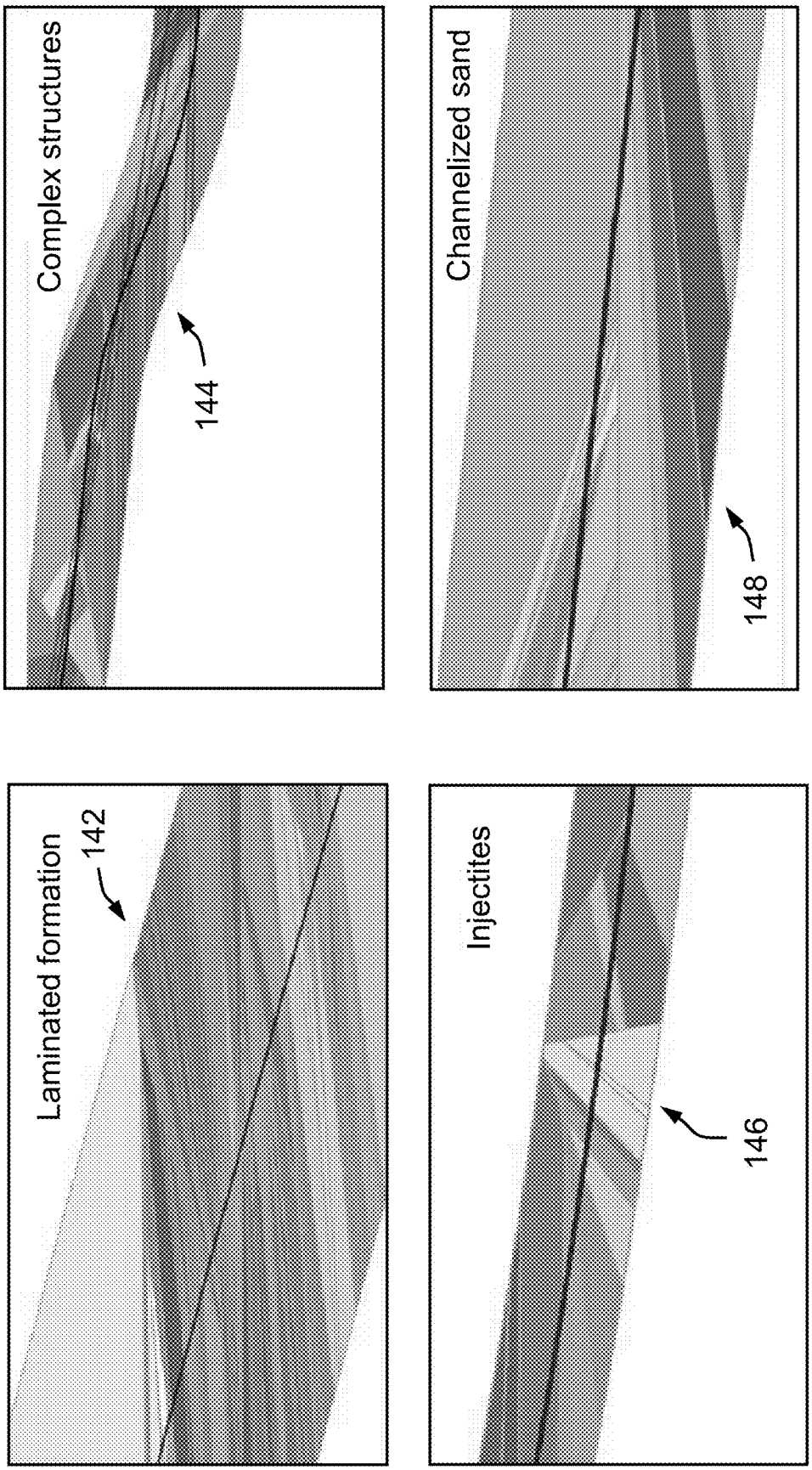
FIG. 11 depicts examples of structural earth models of various types of formations.

FIG. 11 shows some examples of structural earth models constructed as discussed herein for more complex geological environments. The examples include a structural model 142 of a laminated formation, a structural model 144 of various complex structures, a structural model 146 of a formation including injectite features, and a structural model 148 of a formation including channelized sand.

By changing the hierarchy of the features identified by measurement data, e.g., based on how sedimentological and tectonic structures are truncated, non-layer cake geological settings such as those shown in FIG. 11 can also be accurately modeled. For example, bedded formations can be modeled by differentiating between bedding within sedimentological structures between lithological boundaries. More complex structures with potential three-dimensional variations may be represented on a curtain section.

Embodiments described herein may be incorporated in a method of evaluating and modeling a region of an earth formation. The method is used in conjunction with the system 10, although the method may be utilized in conjunction with any suitable combination of processors and networks. The method includes one or more stages. In one embodiment, the method includes the execution of all of stages in the order described. However, certain stages may be omitted, stages may be added, or the order of the stages changed.

In a first stage, measurement data is acquired. Such measurement data may be of any suitable type that permits identification of geological projections. Examples of measurement data include borehole logs, survey data, core sample data and others. Measurement data may include a single value taken at a particular time or depth, or may be multiple values. For example, the processing device receives multiple values at periodic times or substantially continuously, which allows for generating a curve, trend line or other data set describing the behavior or evolution of the measured parameter over time and/or depth.

In one embodiment, measurement data is acquired during an energy industry operation, such as a drilling operation. Exemplary operations include drilling operations, LWD operations, wireline operations, completion operations, stimulation operations and others. It is noted that construction of a structural model according to this method may be performed during (e.g., in real time) the energy industry operation.

In a second stage, the measurement data is analyzed to identify selected data structures formed by the data (e.g., sinusoids), and the data structures are each associated with a specific type of geological feature. In a third stage, each data structure is accounted for by geometrically projecting the data structure from a borehole axis (or other graphical representation) as a geological projection, which can be a line for 2D models or a projection for 3D models.

In a fourth stage, the processing device adjusts one or more geological projections where they intersect with other geological projections. For example, a first geological projection may intersect and truncate a second geological projection if the second geological projection is of a higher level in a selected hierarchy. The interaction between projections is determined for each projection until the structural model is completed.

In a fifth stage, various actions can be performed based on the structural model. Examples of actions include presenting the model and/or related information to an operator, and adjusting operational parameters such as borehole trajectory, inclination, azimuth, toolface, depth, pumping speed, flow rate, weight-on-bit (WOB), torque-on-bit (TOB), rate of penetration (ROP), rotational velocity (rpm), vibration, and time parameters. Other actions can include using the structural model in various simulations and other models, and using the structural model to plan or design energy industry operations. One or more of the actions may be executed in real-time, e.g., while the operation (e.g., drilling operation) is ongoing.

Embodiments described herein present numerous technical effects and advantages. For example, the embodiments provide for improved analysis and estimation of earth formation properties, and improved computational speed in generating structural earth models.

An example of a situation where the more accurate structural models described herein are advantageous is formation evaluation from highly deviated wells. One such situation is Logging-While-Drilling (LWD) in High Angle/

Horizontal (HAHZ) wells. LWD in HAHZ has been primarily used for reservoir navigation purposes, whereas LWD or wirelines in vertical or less deviated wells generally includes a large focus on formation evaluation and reservoir characterization. Therefore, many concepts and processing routines were developed for vertical wells but do not necessarily apply for HAHZ wells. As discussed in this example, a vertical or near vertical well may be defined as a well having a relative angle with respect to bedding (angle between an orthogonal to the well and the bedding) of less than 30°. A moderately deviated well has an angle between 30° and 60°, a high-angle well is defined by an angle between 60° and 80° and a horizontal well has an angle larger than 80°.

As many of the concepts used in petrophysics and formation evaluation (FE) were developed when wells were typically drilled vertically and assumed horizontally layered formations, they do not adequately account for "bed boundary effects" occurring at the boundary between two different formation layers. For vertical or near vertical wells, the significance of bed boundary effects depends mostly on the vertical resolution of the measurement.

However, in High Angle/Horizontal wells, the borehole cuts formations at lower angles (higher relative dip) and the bed boundary effects are more severe. The significance of the effect depends not only on the vertical resolution of the sensor, but also on the angle at which the borehole cuts the formation. Formation evaluation log processing to determine "true" formation properties should consider the local geometry between borehole and formation up to several meters away from the wellbore to allow for tool response simulation of deep-reading measurements.

To accomplish this, a structural Earth model should be used, and thus a more accurate structural model constructed as discussed herein presents a significant benefit. Furthermore, as the inversion process may require a plurality of earth modeling iterations to identify the most appropriate explanation, the structural modeling engine should be sufficiently fast. Construction of structural models as described herein also provides a benefit in this respect by allowing for faster processing and construction of structural models.

Set forth below are some embodiments of the foregoing disclosure:

Embodiment 1

A method of performing a drilling operation in an earth formation, the method comprising: drilling a borehole within the earth formation; receiving data acquired within the borehole in the earth formation; analyzing the data to locate a plurality of data structures formed by the data, the plurality of data structures including a first structure at a first location and a second structure at a second location; projecting the first structure as a first geological projection intersecting the first location, and projecting the second structure as a second geological projection intersecting the second location; classifying the first geological projection and the second geological projection based on a hierarchy of geological feature types to generate a hierarchical classification; and adjusting one or more of the first geological projection and the second geological projection based on the hierarchical classification.

Embodiment 2

The method of any prior embodiment, wherein the data is received during the drilling operation.

Embodiment 3

The method of any prior embodiment, further comprising adjusting a steering direction based on the adjusted one or more of the first geological projection and the second geological projection.

Embodiment 4

The method of any prior embodiment, wherein the data includes an image log, and the plurality of data structures include sinusoids formed by the data at one or more locations along the borehole.

Embodiment 5

The method of any prior embodiment, wherein the data includes a deep-reading measurement.

Embodiment 6

The method of any prior embodiment, wherein analyzing the data includes estimating an orientation of the first geological plane and the second geological plane based on the data.

Embodiment 7

The method of any prior embodiment, wherein adjusting includes truncating the second geological projection at an intersection with the first geological projection.

Embodiment 8

The method of any prior embodiment, wherein adjusting includes truncating the first and second geological projections at an intersection therebetween and combining both projections.

Embodiment 9

The method of any prior embodiment, wherein the geological feature types include at least one of a types of sedimentary features and structural features, and the hierarchy specifies a rank for each type of sedimentary and structural feature.

Embodiment 10

The method of any prior embodiment, wherein adjusting is based on the hierarchy and a general rule, the general rule specifying that if the first geological projection and the second geological projection have the same rank, the first geological projection truncates the second geological projection based on the first geological projection having a greater depth than the second geological projection.

Embodiment 11

The method of any prior embodiment, wherein the structural model is represented as a mathematical graph having an axis corresponding to depth and at least one other axis corresponding to lateral distance.

Embodiment 12

A system for performing a drilling operation in an earth formation, the system comprising: a processing device configured to receive data acquired within a borehole in the earth formation, the processing device configured to perform: analyzing the data to locate a plurality of data structures formed by the data, the plurality of data structures including a first structure at a first location and a second structure at a second location; projecting the first structure as a first geological projection intersecting the first location, and projecting the second structure as a second geological projection intersecting the second location; classifying the first geological projection and the second geological projection based on a hierarchy of geological feature types to generate a hierarchical classification; and adjusting one or more of the first geological projection and the second geological projection based on the hierarchical classification.

Embodiment 13

The system of any prior embodiment, wherein the processing device is configured to adjust a steering direction based on the adjusted one or more of the first geological projection and the second geological projection.

Embodiment 14

The system of any prior embodiment, wherein the data includes at least one of (i) an image log, and the plurality of data structures include sinusoids formed by the data at one or more locations along the borehole and (ii) a deep-reading measurement.

Embodiment 15

The system of any prior embodiment, wherein analyzing the data includes estimating an orientation of the first geological plane and the second geological plane based on the data.

Embodiment 16

The system of any prior embodiment, wherein adjusting includes truncating the second geological projection at an intersection with the first geological projection.

Embodiment 17

The system of any prior embodiment, wherein adjusting includes truncating the first and second geological projections at an intersection therebetween and combining both projections.

Embodiment 18

The system of any prior embodiment, wherein the geological feature types include at least one of a types of sedimentary features and structural features, and the hierarchy specifies a rank for each type of sedimentary and structural feature.

Embodiment 19

The system of any prior embodiment, wherein adjusting is based on the hierarchy and a general rule, the general rule specifying that if the first geological projection and the second geological projection have the same rank, the first geological projection truncates the second geological projection based on the first geological projection having a greater depth than the second geological projection.

Embodiment 20

The system of any prior embodiment, wherein the structural model is represented as a mathematical graph having an axis corresponding to depth and at least one other axis corresponding to lateral distance.

One or more aspects of the embodiments described herein can be included in an article of manufacture (e.g., one or more computer program products) having, for instance, computer usable media. The media has therein, for instance, computer readable instructions, program code means or logic (e.g., code, commands, rules, etc.) to provide and facilitate the capabilities of the present invention. The article of manufacture can be included as a part of a computer system or provided separately. These instructions may provide for equipment operation, control, data collection and analysis and other functions deemed relevant by a system designer, owner, user or other such personnel, in addition to the functions described in this disclosure.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed:

1. A method of performing a drilling operation in an earth formation, the method comprising:
    drilling a borehole within the earth formation;
    receiving data acquired within the borehole in the earth formation;
    analyzing the data to locate a plurality of data structures formed by the data, the plurality of data structures including a first structure at a first location and a second structure at a second location;
    projecting the first structure as a first geological projection intersecting the first location, and projecting the second structure as a second geological projection intersecting the second location;
    classifying the first geological projection and the second geological projection based on a hierarchy of geological feature types to generate a hierarchical classification; and
    adjusting one or more of the first geological projection and the second geological projection based on the hierarchical classification.

2. The method of claim 1, wherein the data is received during the drilling operation.

3. The method of claim 1, further comprising adjusting a steering direction based on the adjusted one or more of the first geological projection and the second geological projection.

4. The method of claim 1, wherein the data includes an image log, and the plurality of data structures include sinusoids formed by the data at one or more locations along the borehole.

5. The method of claim 1, wherein the data includes a deep-reading measurement.

6. The method of claim 1, wherein analyzing the data includes estimating an orientation of the first geological projection and the second geological projection based on the data.

7. The method of claim 1, wherein adjusting includes truncating the second geological projection at an intersection with the first geological projection.

8. The method of claim 1, wherein adjusting includes truncating the first and second geological projections at an intersection therebetween and combining both geological projections.

9. The method of claim 1, wherein the geological feature types include at least one of types of sedimentary features and structural features, and the hierarchy specifies a rank for each type of sedimentary and structural feature.

10. The method of claim 1, wherein adjusting is based on the hierarchy and a general rule, wherein the hierarchy specifies a rank for each geological projection, the general rule specifying that if the first geological projection and the second geological projection have the same rank specified, the first geological projection truncates the second geological projection based on the first geological projection having a greater depth than the second geological projection.

11. The method of claim 1, further comprising representing a structural model, wherein the structural model is represented as a mathematical graph having an axis corresponding to depth and at least one other axis corresponding to lateral distance.

12. A system for performing a drilling operation in an earth formation, the system comprising:
    a processing device configured to receive data acquired within a borehole in the earth formation, the processing device configured to perform:
    analyzing the data to locate a plurality of data structures formed by the data, the plurality of data structures including a first structure at a first location and a second structure at a second location;
    projecting the first structure as a first geological projection intersecting the first location, and projecting the second structure as a second geological projection intersecting the second location;
    classifying the first geological projection and the second geological projection based on a hierarchy of geological feature types to generate a hierarchical classification; and
    adjusting one or more of the first geological projection and the second geological projection based on the hierarchical classification.

13. The system of claim 12, wherein the processing device is configured to adjust a steering direction based on the adjusted one or more of the first geological projection and the second geological projection.

14. The system of claim 12, wherein the data includes at least one of (i) an image log, and the plurality of data structures include sinusoids formed by the data at one or more locations along the borehole and (ii) a deep-reading measurement.

15. The system of claim 12, wherein analyzing the data includes estimating an orientation of the first geological projection and the second geological projection based on the data.

16. The system of claim 12, wherein adjusting includes truncating the second geological projection at an intersection with the first geological projection.

17. The system of claim 12, wherein adjusting includes truncating the first and second geological projections at an intersection therebetween and combining both geological projections.

18. The system of claim 12, wherein the geological feature types include at least one of types of sedimentary features and structural features, and the hierarchy specifies a rank for each type of sedimentary and structural feature.

19. The system of claim 12, wherein adjusting is based on the hierarchy and a general rule, wherein the hierarchy specifies a rank for each geological projection, the general rule specifying that if the first geological projection and the second geological projection have the same rank, the first geological projection truncates the second geological projection based on the first geological projection having a greater depth than the second geological projection.

20. The system of claim 12, further comprising representing a structural model, wherein the structural model is represented as a mathematical graph having an axis corresponding to depth and at least one other axis corresponding to lateral distance.

* * * * *